(12) United States Patent
Chiu et al.

(10) Patent No.: US 7,844,858 B2
(45) Date of Patent: Nov. 30, 2010

(54) METHOD FOR ANALYZING PROGRAM ERRORS

(75) Inventors: Huan-Wen Chiu, Taipei (TW); Chi-Chang Yen, Taipei (TW)

(73) Assignee: Inventec Corporation, Taipei (TW)

( * ) Notice: Subject to any disclaimer, the term of this patent is extended or adjusted under 35 U.S.C. 154(b) by 437 days.

(21) Appl. No.: 12/153,832

(22) Filed: May 27, 2008

(65) Prior Publication Data

US 2009/0228872 A1    Sep. 10, 2009

(30) Foreign Application Priority Data

Mar. 5, 2008    (TW) .............................. 97107721 A (51) Int. Cl.
    *G06F 11/00* (2006.01)
(52) U.S. Cl. .............................. 714/38; 713/2; 717/127; 717/128
(58) Field of Classification Search .................. 714/38; 713/2; 717/127, 128
    See application file for complete search history.

(56) References Cited

U.S. PATENT DOCUMENTS

| | | | | |
|---|---|---|---|---|
| 6,757,783 B2* | 6/2004 | Koh | .............................. | 711/115 |
| 7,401,257 B2* | 7/2008 | Usui | .............................. | 714/27 |
| 2003/0041205 A1* | 2/2003 | Wu et al. | .................... | 710/302 |
| 2004/0031016 A1* | 2/2004 | Vaidyanathan et al. | ...... | 717/110 |
| 2004/0221151 A1* | 11/2004 | Kajita | ............................. | 713/2 |
| 2005/0172038 A1* | 8/2005 | Biggs et al. | .................... | 710/1 |
| 2005/0223145 A1* | 10/2005 | Lin et al. | ...................... | 710/62 |
| 2006/0156157 A1* | 7/2006 | Haselden et al. | ............ | 714/746 |
| 2006/0190770 A1* | 8/2006 | Harding | ....................... | 714/38 |
| 2007/0006035 A1* | 1/2007 | Usui | ............................. | 714/38 |
| 2007/0168746 A1* | 7/2007 | Righi et al. | .................... | 714/38 |
| 2008/0141073 A1* | 6/2008 | Shih et al. | ..................... | 714/36 |
| 2008/0177922 A1* | 7/2008 | Chow et al. | ................. | 710/302 |

* cited by examiner

*Primary Examiner*—Scott T Baderman
*Assistant Examiner*—Loan Truong
(74) *Attorney, Agent, or Firm*—CKC & Partners Co., Ltd.

(57) ABSTRACT

The present invention discloses a method for analyzing program errors, which is implemented on a USB program in a set of BIOS codes, the USB program has some subprograms. Each subprogram represents a processing procedure and consists of some USB source codes. The method comprises steps of embedding output instructions in the subprograms; outputting identified values by the output instructions when executing the subprograms; and providing a set of reference information by the outputted identified values. The reference information allows people checking both the actual sequence that the processing procedures were executed and whether the USB source codes in each subprogram are incorrect.

14 Claims, 8 Drawing Sheets

METHOD FOR ANALYZING PROGRAM ERRORS

RELATED APPLICATIONS

This application claims priority to Taiwan Application Serial Number 97107721, filed Mar. 5, 2008, which is herein incorporated by reference.

BACKGROUND

1. Field of Invention

The present invention relates to a method for analyzing errors in a program. More particularly, the present invention relates to a method for analyzing errors in a USB program by finding out the actual processing sequence of the USB source codes of the USB program.

2. Description of Related Art

A conventional debugging tool for testing Universal Serial Bus (USB) source codes only allows analyzing USB packets being sent and received from a USB port, but not analyzing how USB source codes are processed. For instance, when a testing operator detects that a USB device processes abnormally, the testing operator first gets some USB packets from the USB device and then determines whether these USB packets are abnormal. If these USB packets are determined as normal, the testing operator only can speculate errors of the USB source codes based on the detected abnormal condition. On the other hand, if these USB packets are determined to be abnormal, besides speculating errors of the USB source codes based on the abnormal condition thereby, the testing operator also looks for USB source code errors with an ICE (In Circuit Emulator) and verifies the source code errors.

Because the USB source codes of a USB procedure are processed in connection with time and the USB source codes thereof will continue to initiate timeout events of the related USB procedures after the CPU is called off to process, people are not able to find out what the actual sequences that the source codes of the USB program being executed is, and the incorrect source codes of the USB program if there are incorrect source codes. Thus, the testing operators consume a lot of time speculating about the cause of the source code abnormalities and still struggle to find out the actual processing sequence of how the USB source codes are processed.

SUMMARY

It is therefore an aspect of the present invention to provide a method to analyze errors in a program, which assists users to analyze the actual processing sequence of a USB program and provides information for detecting incorrect source codes of the USB program according to the analyzed processing sequence of the USB program.

In order to achieve the objectives above, the present invention provides a method for analyzing program errors, which is implemented in a USB program in a set of BIOS codes. The USB program consists of a numbers of subprograms and each of the subprograms separately consists of some USB source codes, which represents a processing procedure. The method comprises steps of embedding some output instructions in the subprograms, sequentially executing the output instructions of the subprograms to output identified values at a designated area when the subprograms are executed, and providing reference information in accordance with the outputted identified values. The reference information provides people to check both the actual sequence that the processing procedures were processed and whether the USB source codes of the corresponding subprogram are incorrect.

The present invention also provides a method for providing reference information. The method comprises steps of loading one of the mentioned identified value and the next one identified value according to a sequence of the identified values being arranged, determining whether the loaded identified value matches one representative mark from a comparison list, if yes, determining whether the next loaded identified value matches one checking mark from the comparison list, wherein the checking mark and the representative correspond to the same processing procedure; if yes, outputting a reference element with a processing procedure and its corresponding rank value in accordance with the comparison list. Thus, until all identified values are completely finished being matched, a set of reference information with those reference elements is provided.

Therefore, a testing operator obtains the processing procedures of the subprograms and detects whether the actual sequence of the processing procedure of those subprograms is incorrectly executed or not according to each rank value of the processing procedures; if not, the testing operator only focuses on the incorrect processing procedures and analyses the USB source codes of the incorrect processing procedures, therefore, the method not only provides to shrink the scope of the incorrect processing procedures but also helps to correct the USB source codes of the incorrect processing procedures.

It can be understood that both the foregoing general description and the following detailed description are examples, and are intended to provide a further explanation of the invention as claimed.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or alike parts.

Figure 1:
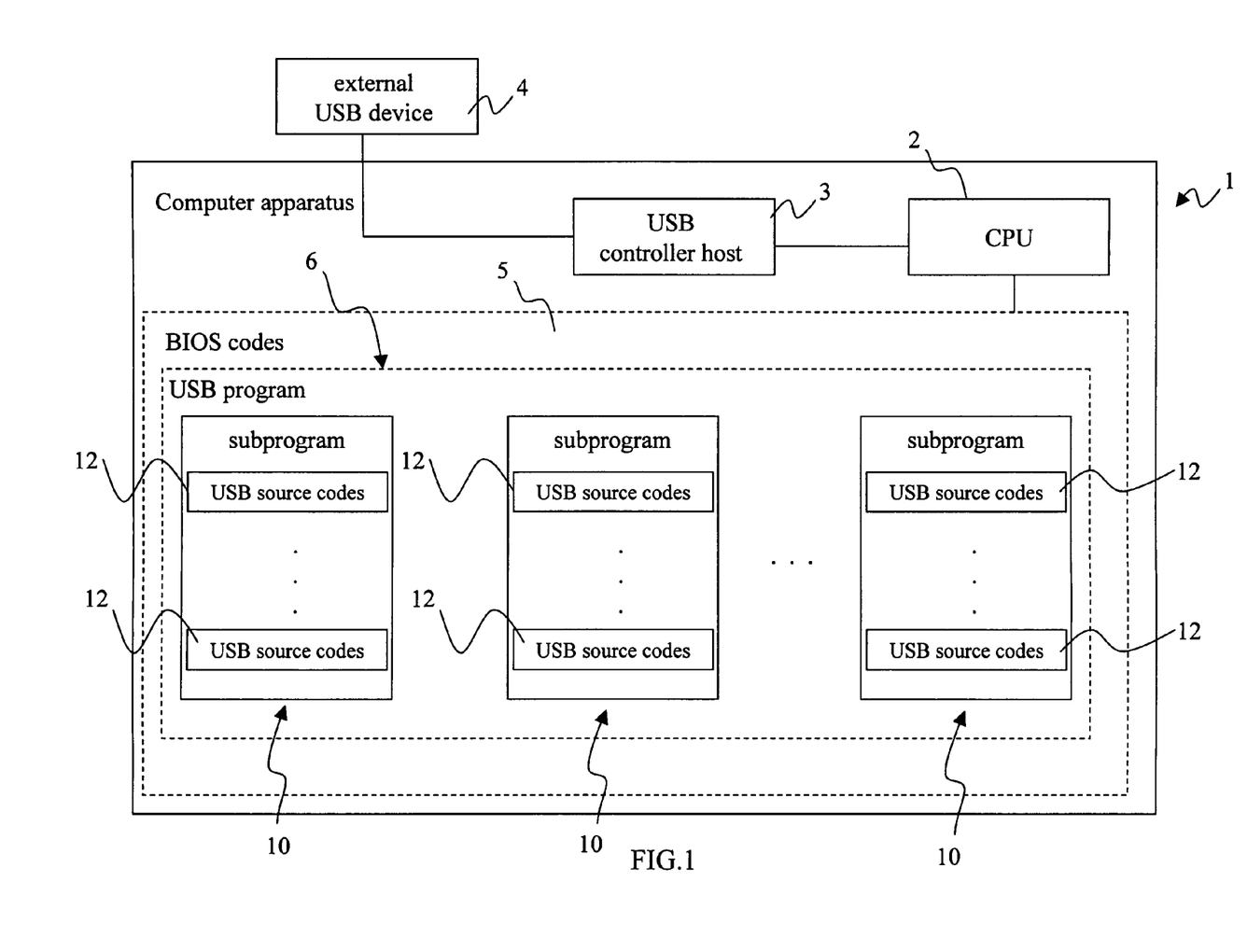
FIG. 1 is a circuit block diagram of a computer apparatus.

A computer apparatus 1, which is capable of connecting an external USB device 4, may have a USB controller host 3 acting as a communication bridge between the external USB device 4 and a CPU 2 thereof. A USB program 6 of a set of Basic Input/Output System (BIOS) codes 5 in the computer apparatus 1 comprises some subprograms 10 in which each of the subprograms 10 respectively represent a processing procedure and consists of a plurality of USB source codes 12.

Since these USB procedures are processed in connection with time, and these USB source codes 12 thereof will be executed to process different ranks of processing procedures collocating with different counted time, the actual processing sequence of these USB procedures is processed is usually unknown, even the CPU 2 is called off to stop the process. Instead of that, after the CPU 2 stops to process, the USB source codes 12 of the subprogram 10 are still executed by the USB controller host 3 resulting in the timeout events of the related USB procedures being mixed up. Therefore, testing operators are unable to check why the erroneous USB source codes 12 exist in the subprogram 10 by traditional troubleshooting methodologies.

Therefore the present invention provides a method for analyzing USB program and a method for providing a set of reference information being a tool in the method for analyzing USB program to help analyze errors in the USB program.

First, the method for analyzing program errors is implemented in a USB program 6 in a set of BIOS codes 5, wherein the method sequentially outputs predetermined identified values to provide a set of reference information 30 when executing the USB source codes 12 of those subprograms 10. By studying the reference information 30, users are aware of the actual processing sequence of the USB program 6 and its conditions so far. Thus, users can shrink the scope of the USB source codes 12 of the incorrect USB program 6, and save time in fixing the incorrect USB source codes 12.

Figure 2:
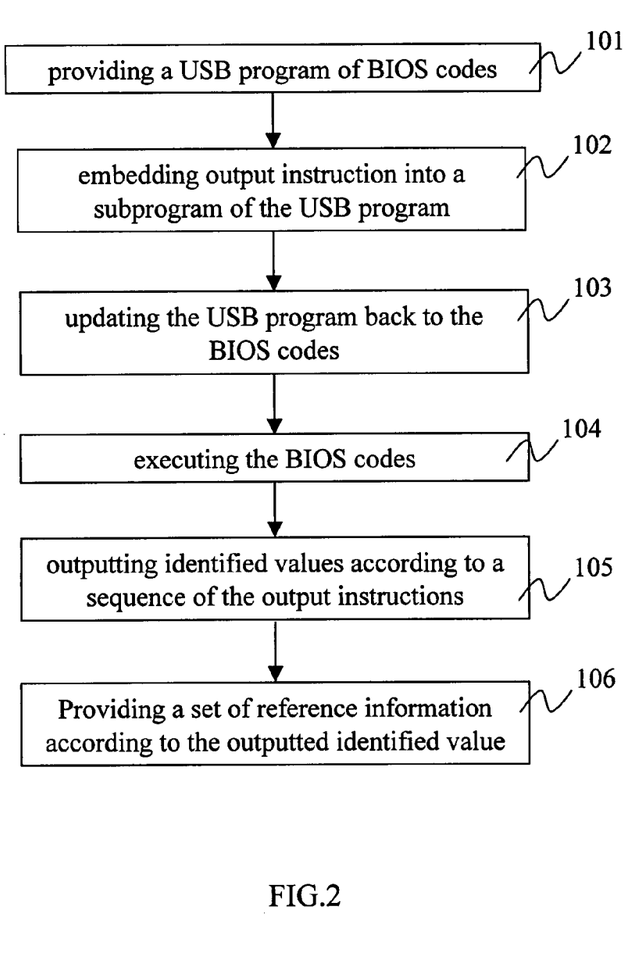
FIG. 2 is a flow chart in one preferred embodiment of the present invention.

FIG. 2 is a flow chart of one preferred embodiment of the present invention. It says as follows:

Step (101) providing an USB program 6:

In this step, a USB program 6 that needs to be tested is provided, wherein the processing procedures in the USB program 6 respectively process data communication tasks among the computer apparatus including the USB host controller 3 and the external device 4, e.g. "checking whether the external device 4 exists", "seeking the relative address of data" and "calculating parameter values" etc. Each of the subprograms may be an "Arithmetic Instruction", "Logic Instruction", "Data Transfer Instruction", "Boolean and Comparison Instruction" or "Jump Instruction" and has a plurality of check points.

Figure 3:
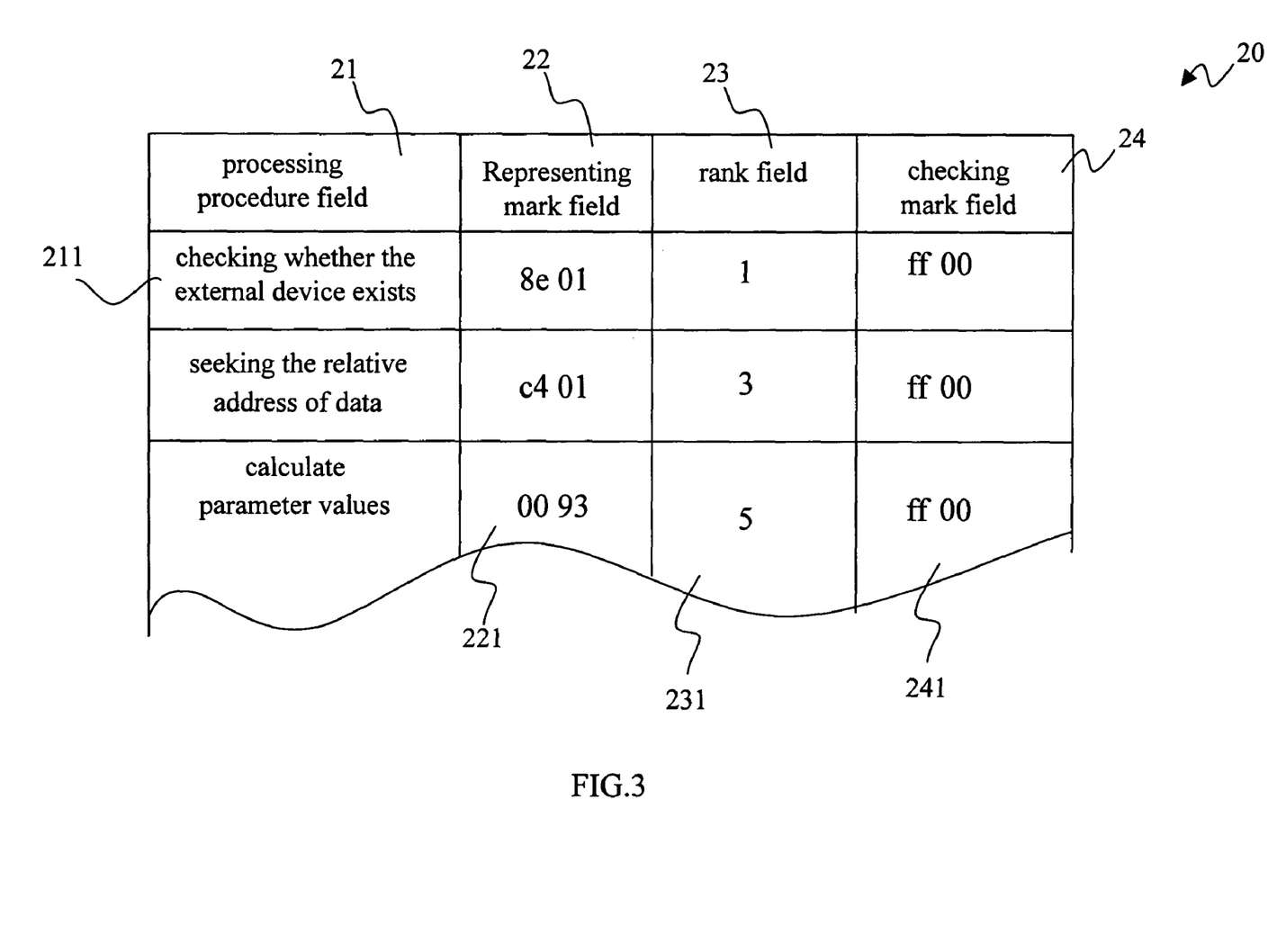
FIG. 3 is a schematic diagram of a comparison list according to the embodiment of the present invention.

Step (102) embedding some output instructions in the USB source codes 12 of the subprograms 10:

Mostly, some check points are set at the beginning part and the finished part of the subprograms 10 for setting the output instructions. Refer to FIG. 3, is a schematic diagram of a comparison list according to the embodiment of the present invention. In this embodiment, what the output instructions instruct for outputting is in accordance with the comparison list 20. The comparison list 20 at least comprises a processing procedure field 21, a representative mark field 22, a rank field 23, and a checking mark field 24, in which the processing procedure field 21 is provided to input numbers of processing procedure names 211 (e.g. "checking whether the external device 4 exists", "seeking the relative address of data" or "calculate parameter values" etc.), the representative mark field 22 is provided to input numbers of representative marks 221 (e.g. "8e 01" or "c4 01" etc.) that correspond to the processing procedure names 211 in the processing procedure field 21, the rank field 23 is provided to input numbers of rank values 231 (e.g. first level to sixth level etc.) that correspond to the processing procedure names 211 in the processing procedure field 21, and the checking mark field 24 is provided to numbers of input checking marks 241 (e.g. "ff 00" etc.) that correspond to the processing procedure names 211 in the processing procedure field 21, wherein the checking mark 241 is used for confirming the corresponding processing procedure is done.

Figure 4A:
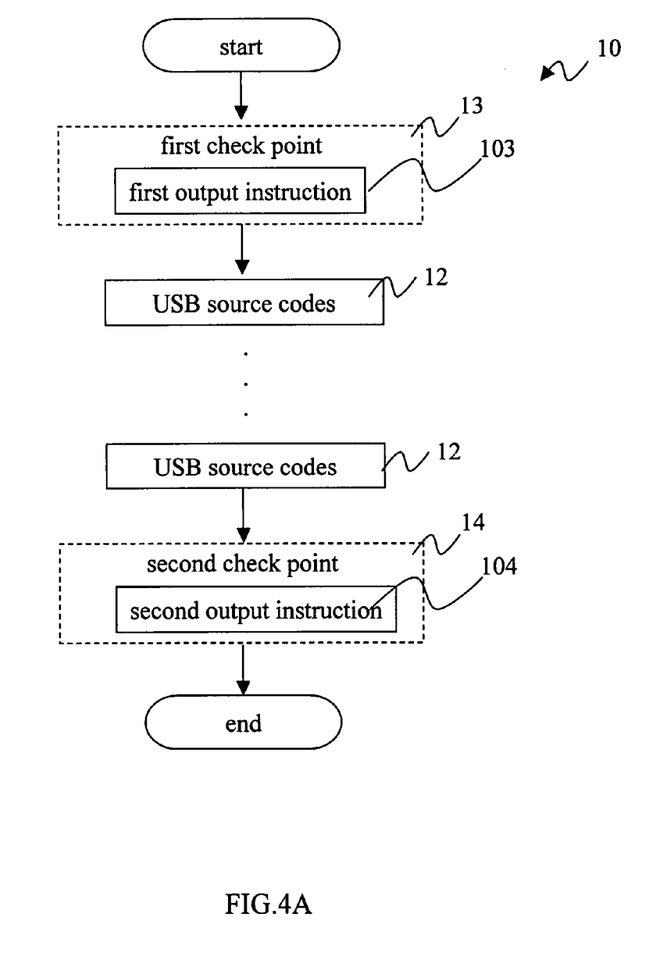
FIG. 4A is a position schematic diagram of check points and output instructions according to the embodiment of the present invention.

Refer to FIG. 4A. FIG. 4A is a position schematic diagram of check points and output instructions when the USB source codes 12 of the subprogram 10 fit the type of "Arithmetic Instruction", "Data Transfer Instruction", or "Jump Instruction". In this embodiment, a first check point 13 is positioned near the initial one of the USB source codes 12 of the subprogram 10; preferably, the first check point 13 is positioned before the initial one of the USB source codes 12 of the subprogram 10. A second check point 14 is positioned near the last one of the USB source codes 12 of the subprogram 10, preferably, the second check point 14 is positioned beyond the last one of the USB source codes 12 of the subprogram 10.

Thus, a first output instruction 103 can be set at the first check point 13 and provide for outputting a representative mark 221 from the representative mark field 22 corresponding to a processing procedure name 211 in the processing procedure field 21. A second output instruction 104 can be set at the second check point 14, and provide for outputting a checking mark 24 from the checking mark field 24 corresponding to the processing procedure name 211 in the processing procedure field 21.

Figure 4B:
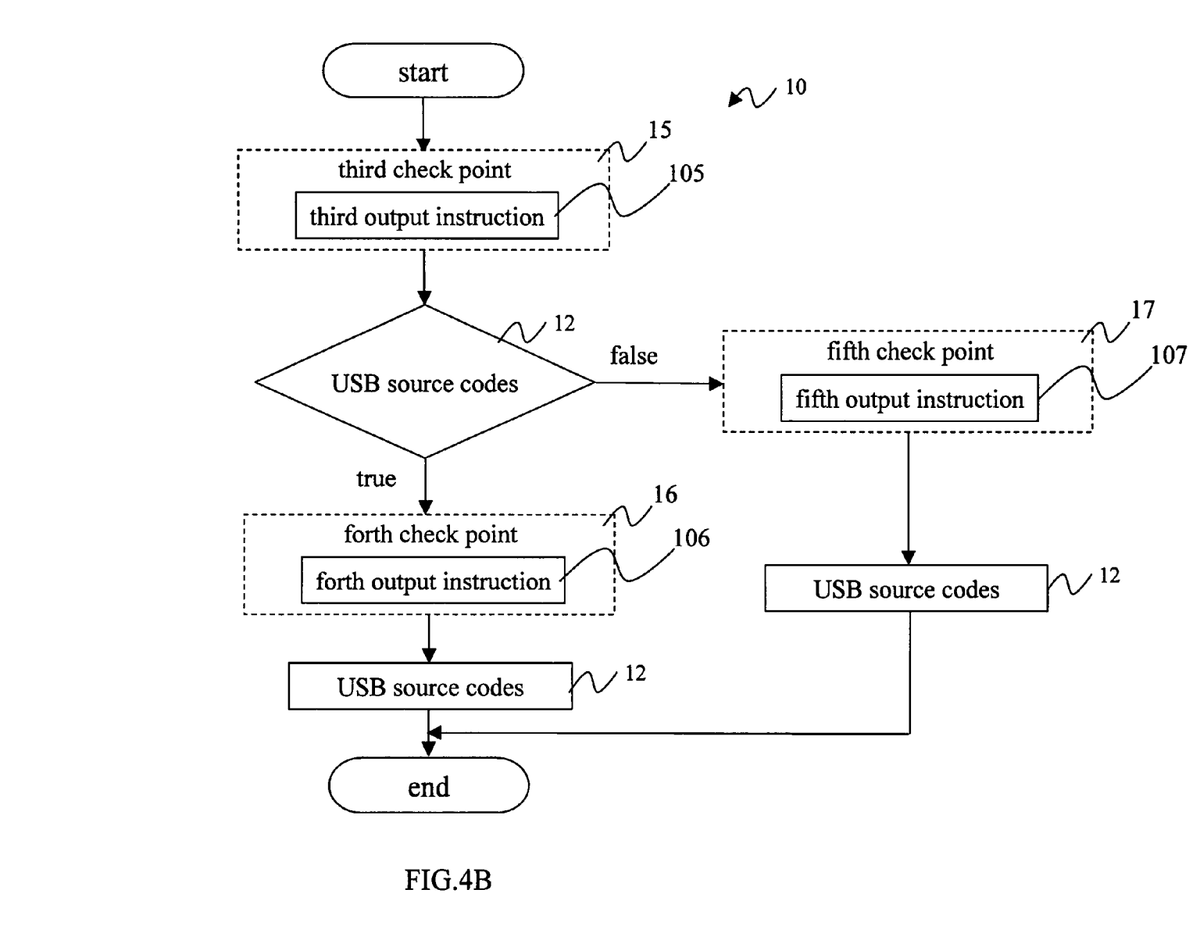
FIG. 4B is another position schematic diagram of check points and output instructions according to the embodiment of the present invention.

Refer to FIG. 4B. FIG. 4B is another position schematic diagram of check points and output instructions when USB source codes 12 of a subprogram 10 fit the type of "Logic Instruction" or "Boolean and Comparison Instruction". In this embodiment, a third check point 15 is positioned before USB source codes 12' for a conditional sentence (e.g. to determine whether or not) in the subprograms 6, a fourth check point 16 is positioned after USB source codes 12' for a "true" conditional expression of the conditional sentence in the subprograms 6, and a fifth check point 17 is positioned after USB source codes 12' for a "false" conditional expression of the conditional sentence in the subprograms 6.

Thus, a third output instruction 105 can be set at the third check point 15 and provide for outputting a representative mark 221 from the representative mark field 22 corresponding to a processing procedure name 211 in the processing procedure field 21. A fourth output instruction 106 can be set at the fourth check point 16, and provide for outputting a checking mark 24 from the checking mark field 24 corresponding to the processing procedure name 211 in the processing procedure field 21. A fifth output instruction 107 can be set at the fifth check point 17, and provide for outputting another checking mark 24 from the checking mark field 24 corresponding to the processing procedure name 211 of in the processing procedure field 21.

It needs to be understood that the step (102) can be carried out manually or through software but is not limited to these two implementations.

step (103) saving the USB program 6 back to the BIOS codes 5;

In this step, compiling the USB program 6 embedded with output instructions and updating it to the BIOS codes 5.

step (104) executing the BIOS codes 5 of the computer apparatus 1;

In this step, after the computer apparatus 1 is rebooted, it starts to execute the Power On Self Test (POST) procedure and the BIOS codes 5. After the BIOS codes 5 checks that the USB controller host 3 is correctly connected the external USB device 4, the USB program 6 including its subprograms 10 inside starts to be executed. For a purpose of preventing redundancy when the USB program 6 is executed, the USB program 6 can be reset before one output instruction 107 is executed.

Figure 5:
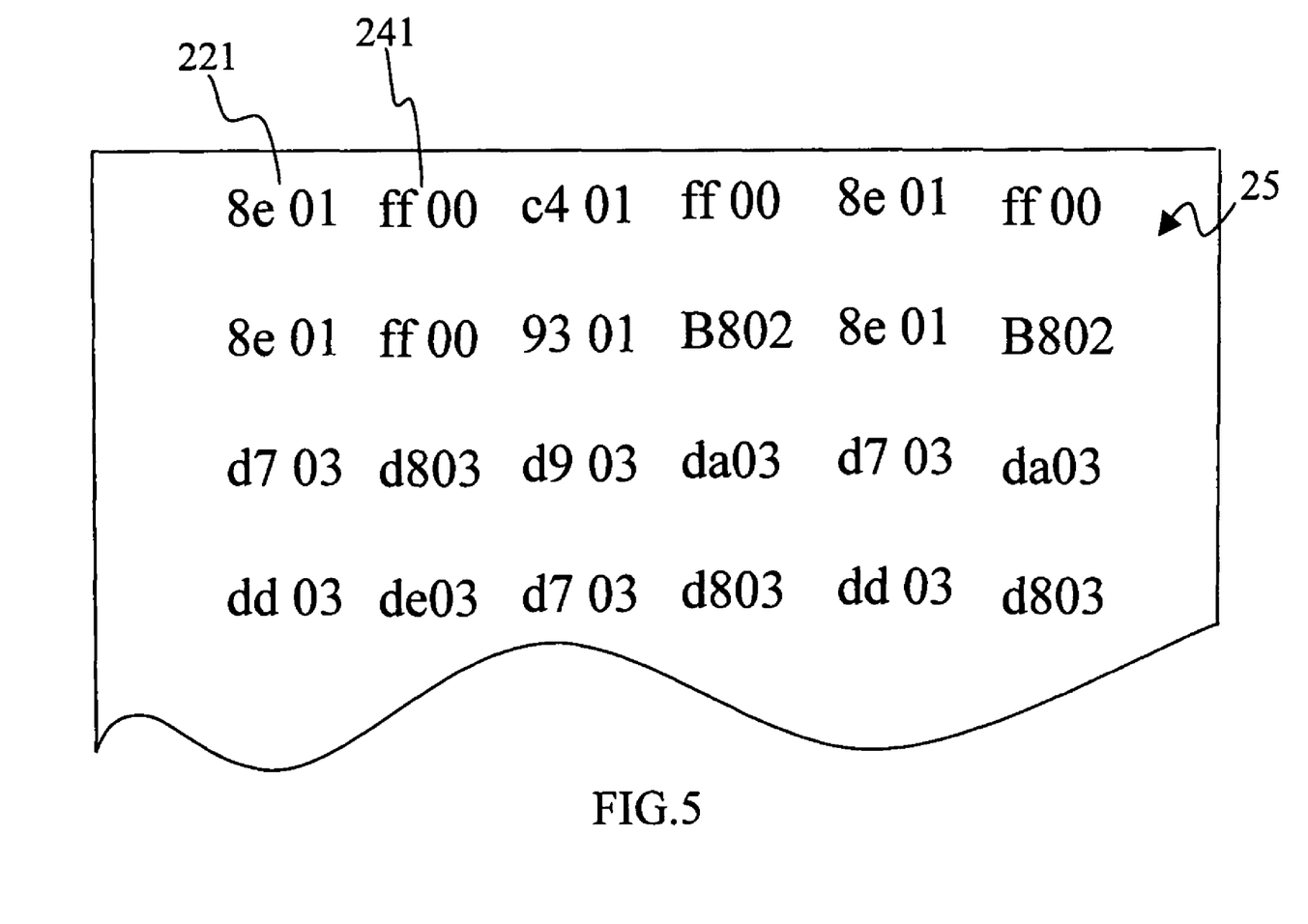
FIG. 5 is an arrangement of schematic diagram for outputted identified values according to the embodiment of the present invention.

Step (105) sequentially outputting an identified value 25 at a designated area when the output instructions 107 are sequentially executed:

Refer to FIG. 5, an arrangement of schematic diagram for outputted identified when the USB program 6 is executed, the USB program 6 sequentially outputs and stores an identified value 25 into an area such as a disk (e.g. floppy disk, hard disk), memory (e.g. RAM or flash memory) in accordance with the sequence of the output instructions 107 are executed. As mentioned above, one of those identified values 25 outputted by what output instruction instructs can be a representative mark 221 and/or a checking mark 241 depending on the different position of the check points that the output instruction being embedded.

For the above embodiments, the identified values 25, which are outputted by the first output instruction 103 or the third output instruction 105, are the representative marks 221. If one of the representative marks 22 is outputted, it proves that the corresponding process procedure of the subprogram 10 has been begun. The identified values 25, which are outputted by the second output instruction 104, are the checking marks 241. If one of the checking marks 241 is outputted, it proves that the corresponding process procedure of the subprogram 10 has been finished. More particularly, the identified values 25, which are outputted by the fourth output instruction 106 or the fifth output instruction 107, are the checking marks 241 and if one of the checking marks 241 is outputted, it proves that the corresponding process procedure of the subprogram 10 goes a "true" conditional expression or a "false" conditional expression thereof.

Figure 7:
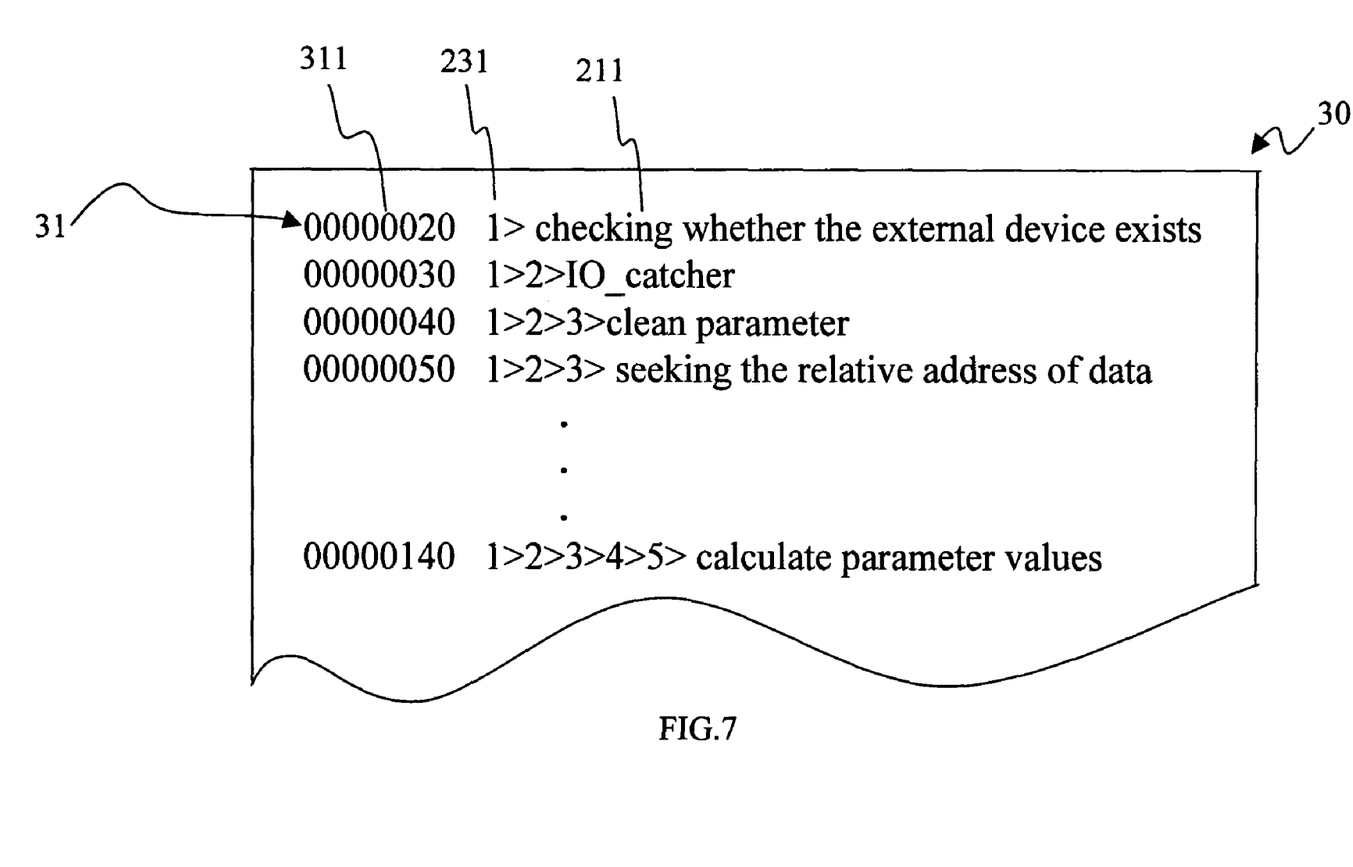
FIG. 7 is a schematic diagram of a set of reference information in the preferred embodiment of the present invention.

Step (106) providing a set of reference information 30 based on the identified values 25 in the designated area:

The reference information 30 can be used for checking both the actual sequence that the processing procedures of the subprograms 10 are being executed, and whether the USB source codes 12 of the corresponding subprogram 10 are incorrect or not. Refer to FIG. 7. FIG. 7 is a schematic diagram of a set of reference information 30 in the preferred embodiment of the present invention. The reference information 30 includes a processing sequence and rank list (see FIG. 7), and a detailed source codes (not shown in figure). The processing sequence and rank list consists of a plurality of reference elements 31. Each of the reference elements 31 has an order number 311, a rank value 231 and a processing procedure name 211, and the detailed source codes are a combination of the USB source codes 12 according to the subprograms 10 that used to be executed respectively in the actual processing sequence.

Figure 6:
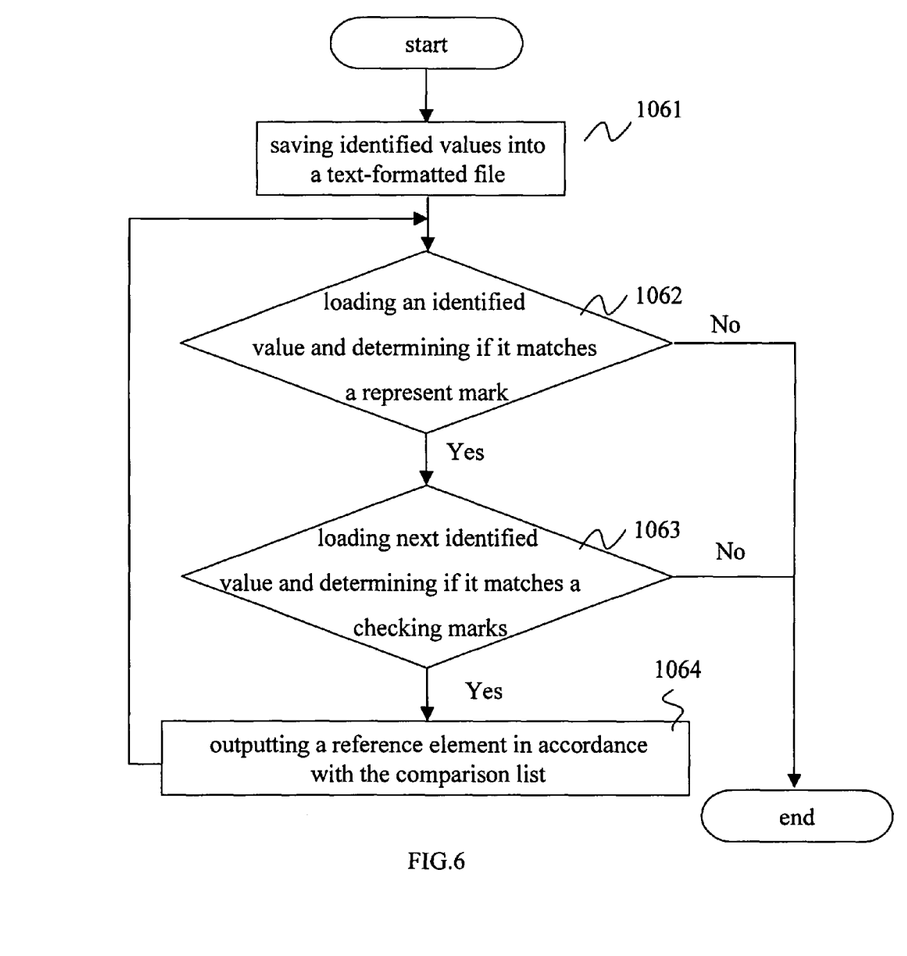
FIG. 6 is a detailed flow chart of providing a processing sequence and rank list in the preferred embodiment of the present invention.

Refer to FIG. 6 and FIG. 7. FIG. 6 is a detailed flow chart of providing a processing sequence and rank list in the preferred embodiment of the present invention. The detailed steps of the production of a processing sequence and rank list introduced as follows:

Step (1061) saving these identified values 25 of the designated area into a text-formatted file;

Step (1062) loading an identified value 25 from the text-formatted file according to a sequence of the identified values 25 arranged in the text-formatted file and respectively comparing the loaded identified value 25 with the comparison list 20 and determining whether the loaded identified value 25 matches one of the representative marks 221 in the representative mark field 22, if, yes, process step (1063), else, end the production;

Step (1063) loading the next identified value 25 from the text-formatted file according to the sequence of the identified values 25 in the text-formatted file and comparing the next loaded identified value 25 with the comparison list 20 and determining whether the next loaded identified value 25 matches one of the checking marks 241 in the checking mark field 24, wherein the checking mark 241 and the representative mark 221 correspond to the same processing procedure name 211, if, yes, process step (1064), else, end the production and sent an erroneous message;

Step (1064) outputting a reference element 31 with an order number 311, a rank value 231 and a processing procedure name 211 in accordance with the comparison list 20, wherein the rank value 231, the checking mark 241 and the representative mark 221 are corresponding to a same processing procedure name 211. Then, processing back to the step (1061) to continually output reference elements 31 after completely finishing the match work of all identified values 25 in the text-formatted file. Thus, all of the reference elements 31 can be gathered to a processing sequence and rank list.

Hence, by reading the reference information 30 (i.e. the processing sequence and rank list and the detailed source codes), the testing operator obtains the processing procedures of the subprograms 10 and detects whether an actual sequence processing procedure of those subprograms 10 which has been executed is incorrect or not; if not, the testing operator only focuses on the incorrect processing procedures and analyses the cause of the incorrect USB source codes 12 of the corresponding subprogram 10, therefore, it is not only to shrink the scope of the incorrect processing procedures but also to correct the USB source codes of the incorrect processing procedures.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for analyzing program errors, which is implemented in a USB program in a set of BIOS codes, the method comprising:

(a) providing a USB program wherein the USB program has a plurality of subprograms and each of the subprograms separately represents a processing procedure and consists of a plurality of USB source codes;

(b) embedding a plurality of output instructions in the subprograms;

(c) sequentially executing the output instructions of the subprograms to output identified values at a designated area when the subprograms of the USB program are executed; and (d) providing a set of reference information capable of checking both the actual sequence that the processing procedures are executed, and whether the USB source codes of the corresponding subprogram are incorrect.

2. The method of claim 1, wherein each of the output instructions in (b) is respectively set at one check point in the subprogram.

3. The method of claim 2, wherein the output instructions in (b) are set according to a comparison list having a plurality of representative marks and checking marks.

4. The method of claim 3, wherein the comparison list at least comprising:
  a processing procedure field with processing procedures;
  a representative mark field with representative marks, each of the representative marks respectively corresponding to one of the processing procedures in the comparison list;
  a rank field with rank values, each of rank values corresponding to one of the processing procedures in the comparison list; and
  a checking mark field with checking marks, each of the checking marks corresponding to one of the processing procedures in the comparison list.

5. The method of claim 4, wherein the output instructions in (b) comprising:
  a first output instruction set at a first check point positioned near the initial one of the USB source codes of the subprograms; and
  a second output instruction set at a second check point positioned near the last one of the USB source codes of the subprograms.

6. The method of claim 5, wherein the first output instruction provides to output a representative mark corresponding a processing procedure of the comparison list, and the second output instruction provides to output a checking mark corresponding a processing procedure of the comparison list.

7. The method of claim 6, wherein one of the identified values in (c) comprises both one of the representative marks outputted according to the corresponding first output instruction, and one of the checking marks outputted according to the corresponding second output instruction.

8. The method of claim 4, wherein the output instructions in the step (b) comprising:
  a third output instruction set at a third check point positioned before USB source codes for a conditional sentence in the subprograms;
  a fourth output instruction set at a fourth check point positioned after USB source codes for a "true" conditional expression of the conditional sentence in the subprograms; and
  a fifth output instruction embedded at a fifth check point positioned after USB source codes for a "false" conditional expression of the conditional sentence in the subprograms.

9. The method of claim 8, wherein the third output instruction provides to output a representative mark corresponding to a processing procedure of the comparison list, and both the fourth and fifth output instructions provide to output a checking mark corresponding respectively to the processing procedure of the comparison list.

10. The method of claim 9, wherein one of the identified values in (c) comprises one of the representative marks outputted according to the corresponding third output instruction, one of the checking marks outputted according to the corresponding fourth output instruction and another of the checking marks outputted according to the corresponding fifth output instruction.

11. The method of claim 4, wherein (d) further comprises:
  saving these identified values of the designated area into a text-formatted file;
  sequentially loading an identified value of the text-formatted file according to a sequence of the identified values in the text-formatted file;
  determining whether the loaded identified value matches one of the representative marks from the representative mark field;
  When the loaded identified value matches one of the representative marks from the representative mark field, loading the next identified value;
  determining whether the next loaded identified value matches one of the checking marks in the checking mark field, wherein the checking mark and the representative mark are corresponding to a same processing procedure;
  When the next loaded identified value matches one of the checking marks from the checking mark field, outputting a reference element with the processing procedure and a rank value in accordance with the comparison list; and
  gathering all of the reference elements to be the reference information after completely finishing the match of all identified values in the text-formatted file.

12. The method of claim 11 further comprising:
  after (d), collecting the USB source codes in the subprograms that were executed respectively in an actual sequence of the processing procedures that have been checked.

13. The method of claim 1, wherein (c) further comprises:
  resetting the USB program to prevent redundancy when the USB program is executed.

14. A method for providing reference information, which is implemented on the identified values as claimed in claim 1 and a comparison list with at least a processing procedure and its corresponding representative mark, rank value and checking mark, the method comprising:
  loading an identified value and a next identified value according to a sequence of the identified values;
  determining whether the loaded identified value matches one representative mark from the comparison list;
  When the loaded identified value matches one representative mark from the comparison list, determining whether the next loaded identified value matches one checking mark from the comparison list;
  When the next loaded identified value matches the checking mark from the comparison list, outputting a reference element with a processing procedure and its corresponding rank value in accordance with the comparison list; and
  gathering the reference elements to provide a set of reference information after completely finishing the match of all identified values.

* * * * *